H. K. KOUYOUMJIAN.
ELECTRIC GENERATOR.
APPLICATION FILED AUG. 5, 1913.
1,219,564.
Patented Mar. 20, 1917.
3 SHEETS—SHEET 2.
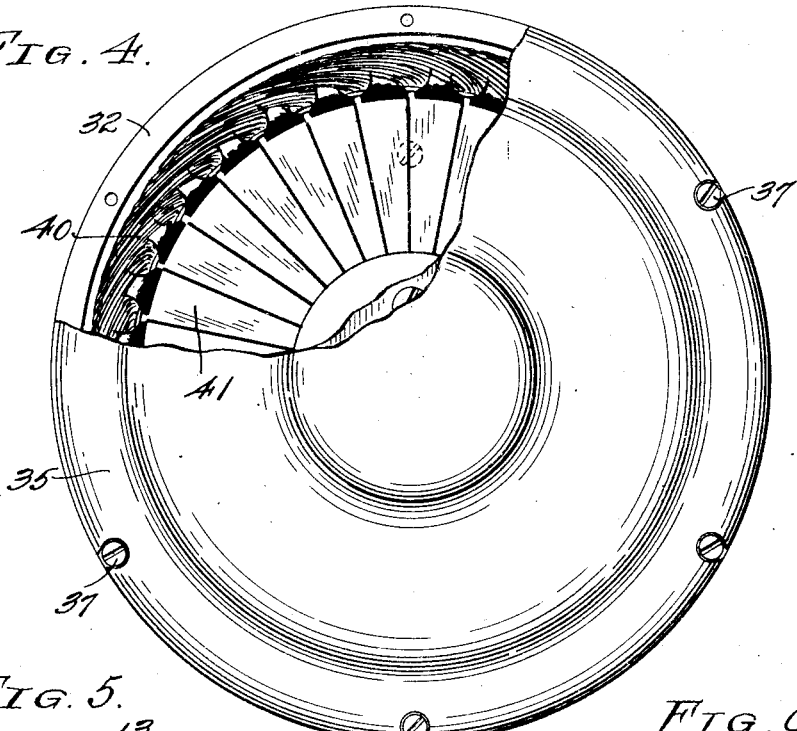
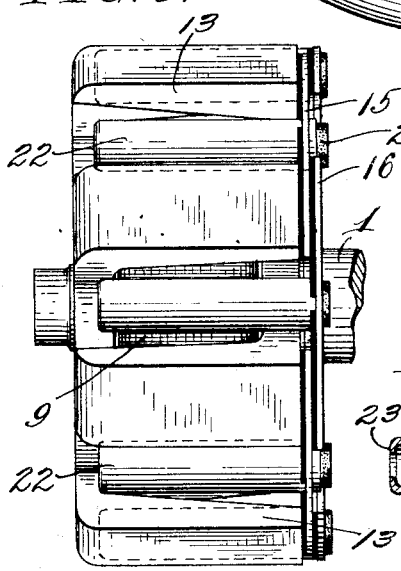
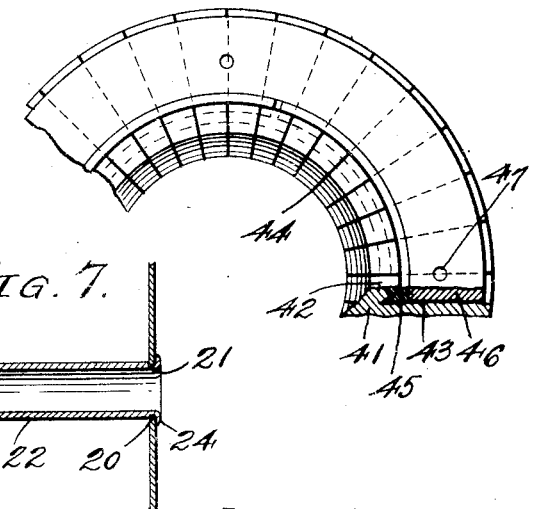
Witnesses:
A. L. Lord
C. H. Tresch
Inventor.
Haroutiun K. Kouyoumjian
by B. W. Brockett,
Att'y.

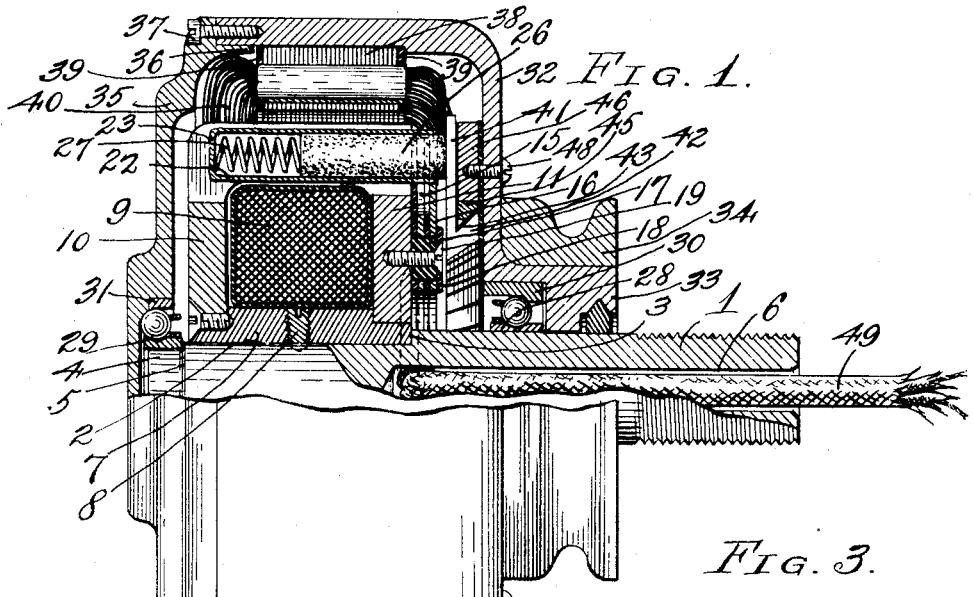

H. K. KOUYOUMJIAN.
ELECTRIC GENERATOR.
APPLICATION FILED AUG. 5, 1913.

1,219,564.

Patented Mar. 20, 1917.
3 SHEETS—SHEET 3.

Witnesses:
A. L. Lord,
C. H. Tresch.

Inventor.
Haroutiun K. Kouyoumjian
by B. U. Brockett
Att'y.

UNITED STATES PATENT OFFICE.

HAROUTIUN K. KOUYOUMJIAN, OF CLEVELAND, OHIO, ASSIGNOR TO THE KEMCO ELECTRIC MANUFACTURING COMPANY, OF CLEVELAND, OHIO, A CORPORATION OF OHIO.

ELECTRIC GENERATOR.

1,219,564.      Specification of Letters Patent.      Patented Mar. 20, 1917.

Application filed August 5, 1913. Serial No. 783,083.

*To all whom it may concern:*

Be it known that I, HAROUTIUN K. KOUYOUMJIAN, a subject of the Sultan of Turkey, residing at Cleveland, in the county of Cuyahoga and State of Ohio, have invented certain new and useful Improvements in Electric Generators, of which the following is a specification.

This invention relates generally to electric generators or dynamos and particularly to that class of devices which are inherently and automatically self-regulating.

The invention resides partly in certain details of construction which cause the inherent regulation.

The invention also resides in certain details of structure such as the arrangement of the brush holder, brushes and other parts, whereby the device is small in size and yet possesses great efficiency.

The invention may be further briefly summarized as consisting in the combination and arrangement of parts hereinafter set forth in the following description, drawings and claims.

Figure 8:
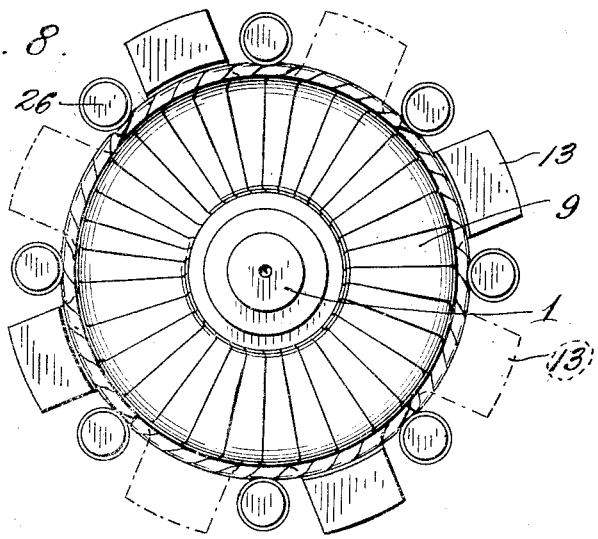
Figure 9:
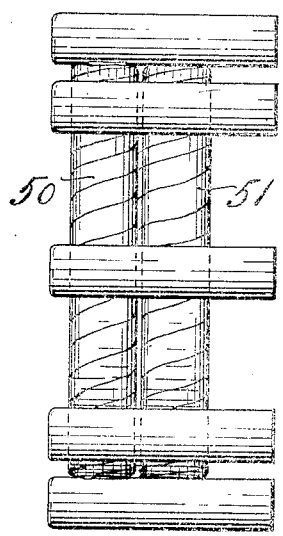
Figure 10:
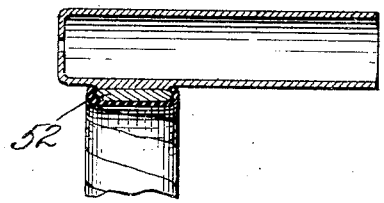
Figure 11:
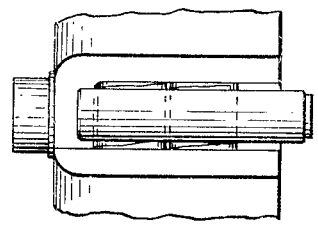

Referring to the drawings, Figure 1 is a side elevation with a portion thereof broken away in section, showing a portion of the internal construction; Fig. 2 is a front view looking at the face of the brush holders, with portions broken away showing the face of the field frame and the ends of the pole pieces; Fig. 3 is a detail view showing portions of the field frame and one of the pole pieces illustrating the fixed leakage gap; Fig. 4 is a front view of the generator with a portion of the cover broken away and with the complete field magnet and brush holder removed to clearly show the construction of the commutator; Fig. 5 is a side elevation of the field magnet and brush holder construction; Fig. 6 is a rear elevation of a portion of the commutator; Fig. 7 is a detailed view of a brush holder tube; Fig. 8 represents a field structure with a modified form of brush holder applied thereto; Fig. 9 is a side elevation of this brush holder; Fig. 10 is a sectional view through one of the brush holder tubes; and Fig. 11 is a side elevation of a portion of the field frame structure and pole pieces showing a brush holder tube in place.

In carrying out the invention any preferred form and construction of parts may be employed, so long as they possess the necessary features, but I have shown one arrangement in the drawings which is highly effective in operation, and in such embodiment 1 represents the main supporting shaft having a reduced portion 2 forming a shoulder 3, and another reduced portion 4 forming a shoulder 5. The shaft is also provided with an opening 6 extending for the greater part of its length as shown, and adapted to receive the leads passing out from the generator as will later appear. Extending over the reduced portion 2 is a sleeve 7 which is held in place by a suitable set screw 8, the reduced portion 2 of the shaft and the sleeve 7 forming the core of the field magnet. Extending around this core, comprising the reduced portion 2 of the shaft and the sleeve 7, is a field coil 9 having leads extending therefrom and connected in a manner to be later described.

Secured to the sleeve 7 and preferably to reduced end portions at each end beyond the field coil 9 are field frame members 10 and 11 which are in the form of disks having preferably four evenly spaced projections 12, as shown in Fig. 2, which extend out radially and are integral with pole pieces 13, a portion of the two frames and two of the pole pieces being shown in Fig. 3. There are preferably four pole pieces for each field frame member, and they all extend across the periphery of the field coil and over the opposite field frame member, so that pole pieces of like polarity are interspersed with pole pieces of the opposite polarity beyond the periphery of the field coil. The pole pieces 13 are preferably tapered on the inside, as shown in Fig. 3, so that the end 14 is reduced in size and the gap between this end portion and the adjacent field frame or disk member is arranged so that it is less than the gap between adjacent pole pieces. This gap is utilized for cutting down the lines of magnetic force of the field magnet passing through the armature and assists in the regulation of the output of the generator at high speeds.

The brush holder and brush construction is secured to the face of the field magnet structure and preferably to the face of the field frame member 11, and it consists of two conducting plates 15 and 16 each of which is provided with suitable openings for receiving insulators 17 which, together with washers 18 and screws 19, provide means for securing the two plates and the entire brush holder structure to the field magnet. Each of these plates is preferably provided with openings 20, as shown in Fig. 7, for receiving the reduced ends 21 of brush holder tubes 22. Each brush holder tube is provided with an inwardly turned end portion 23, as shown in Fig. 7, and with an outwardly turned flange 24 extending over the plate, this latter flange holding the tube firmly to the brush holder plate. In the present instance there are four of these brush holders in each plate. Each of the plates is further provided with suitable openings 25, as shown in Fig. 2, arranged between the brush holder tubes of the plates. By this construction it will be seen that the brush holders of one plate can be moved so as to pass through the openings 25 of the other plate and by insulating the plate 15 from the field frame and the plate 16 from the plate 15, these plates will form electrical connections between like brushes and will also serve to hold the brushes in place. Within each of the brush holder tubes 24 is a brush 26 preferably of carbon, and behind each of the brushes is a spring 27 which normally tends to force the brush out of the tube.

Mounted upon the shaft 1 is an internal ball race 28 and on the reduced portion 4 is another internal ball race 29. These ball races receive balls which coöperate with external ball races 30 and 31 respectively.

Mounted upon the ball races 30 and 31 is the main casing member 32 provided with a boss 33 for receiving a driving pulley 34. This casing receives a cover 35 provided with a flange 36 extending into the casing. The cover is secured to the main casing member by means of screws 37 or in any other suitable manner. Fitting tightly into the casing is a suitable armature 38 made up of laminations secured together in any suitable manner and having at the ends thereof suitable insulating rings 39 of fiber or any other suitable material. The armature core is slotted in the usual manner, and in the slots of the core are placed the coils 40 of the armature winding.

Secured on the interior and to the back face of the main casing is a commutator comprising a plurality of sector shaped commutator sections 41, each having upon its back an extension 42 which is undercut, as shown in Fig. 1, so as to form a peripheral undercut groove. Suitable insulation 43 is placed against the face of the undercut portion of the projection 42 and against the backs of the commutator sectors and the several parts of the commutator with the insulators 44 between are held together by means of a split ring 45 which is spread over the projection 42 and permitted to snap into the undercut recess. This split ring is held in place by means of a confining ring 46 pressed onto the periphery of the split ring 45. By this arrangement the confining ring 46 forces the split ring 45 into place and causes the commutator sections or sectors together with the insulation therebetween to be drawn tightly together. The confining ring 46 is provided with suitable threaded openings 47 for receiving screws 48 to hold the commutator to the back of the case.

In wiring the generator the two leads of a two-wire cable 49 are led through the opening 6 into the interior of the generator. The separate wires are then conveyed through transversely disposed openings 6' and through recesses 11' in the outside face of the frame member or disk 11 of the field frame. One of these wires is secured to one of the brush holder tubes of the set of brush holders carried by one brush holder plate, while the other wire is secured to one of the brush holders of the other plate. This is shown clearly in full and dotted lines in Fig. 2. The leads from the field coil are then connected to either the same brush holders to brush holders in a similar manner. In wiring the armature each coil is connected to adjacent commutator sectors with adjacent coils connected to the same sector whereby the coils are interconnected with respect to the commutator.

The generator above described is inherently self-regulating, for the reason that as the speed varies the leakage of field flux across the so-called magnetic leakage gap is correspondingly varied. This is due to the fact that as the speed increases the armature reaction increases, and this increases the reluctance of the air gap between the field poles and the armature core, with the result that an increased amount of field flux is diverted from the armature and passes across the leakage gap. In consequence, the voltage of the generator remains substantially constant, and the battery connected to the generator is charged at a substantially constant ampere rate.

In Figs. 8, 9, 10 and 11 I have shown the modified form of brush holder wherein there are two rings 50 and 51 each of which is made up of a brass annulus or ring 52 secured to the brush holders by welding or in any other preferred manner. Four brush holder tubes are secured to each ring, and the rings are arranged between the field coil 9 and the pole pieces 13.

Having described my invention, I claim:

1. In a dynamo electric machine, an armature, a field magnet structure including a field frame or core, pole pieces in proximity to the armature, a flat commutator with coplanar segments at the side of and facing the field magnet structure, a pair of brush supporting rings supported by the field magnet structure and insulated from each other, and axially disposed brush holders and brushes therein arranged between the pole pieces and secured to said rings.

2. In a dynamo electric machine, an armature, including a core in the form of an annulus, a field magnet structure within the core and including a field frame with pole pieces projecting axially in opposite directions from the sides of the field magnet structure, a flat commutator including coplanar segments arranged at the side of and facing the field magnet structure, axially disposed brush holders containing brushes arranged between the pole pieces and a pair of brush supporting rings supported by the field magnet structure and in turn supporting said brush holders and brushes.

3. In a dynamo electric machine, a field magnet structure comprising a field frame or core, and an annular field coil inclosed thereby said core being provided with spaced pole pieces projecting axially in opposite directions from the side of the frame or core over the periphery of the field coil, axially disposed brush holders arranged between the pole pieces, and a pair of insulated brush holder supporting rings arranged between the field coil and the pole pieces and connected to said brush holders.

4. In a dynamo electric machine, a casing, an armature having an annular core carried by the casing, a field magnet structure within the annular core of the armature and comprising a field frame or core, and an annular field winding inclosed thereby said frame or core including a pair of side plates on opposite sides of the coil and provided with axially disposed pole pieces projecting alternately in opposite directions from said plates immediately over or around said field coil, a flat commutator secured to the casing opposite the field magnet structure and having coplanar segments facing the latter, axially disposed brushes arranged in the spaces between the pole pieces and a pair of brush supporting rings insulated from each other and arranged between the field coil and the pole pieces the brushes projecting laterally beyond the field structure and engaging the flat face of the commutator.

In testimony whereof I affix my signature in presence of two witnesses as follows.

HAROUTIUN K. KOUYOUMJIAN.

Witnesses:
G. O. FARQUHARSON,
T. M. CASE.

Copies of this patent may be obtained for five cents each, by addressing the "Commissioner of Patents, Washington, D. C."